US008132557B2

(12) United States Patent
Joos et al.

(10) Patent No.: US 8,132,557 B2
(45) Date of Patent: Mar. 13, 2012

(54) FUEL SYSTEM OF A HANDHELD WORK APPARATUS

(75) Inventors: Steffen Joos, Murr (DE); Klaus Langhans, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 337 days.

(21) Appl. No.: 12/588,868

(22) Filed: Oct. 30, 2009

(65) Prior Publication Data

US 2010/0126475 A1 May 27, 2010

(30) Foreign Application Priority Data

Nov. 24, 2008 (DE) ........................ 10 2008 058 498

(51) Int. Cl.
*F02M 37/04* (2006.01)
*F16L 43/00* (2006.01)
*B01D 27/00* (2006.01)

(52) U.S. Cl. ........ 123/509; 210/440; 210/443; 137/129; 137/140

(58) Field of Classification Search .................. 123/468, 123/469, 509, 510; 210/439, 440, 443, 444, 210/448, 459, 460; 137/124, 129, 140, 142
See application file for complete search history.

(56) References Cited

U.S. PATENT DOCUMENTS

| | | | | |
|---|---|---|---|---|
| 4,492,250 | A * | 1/1985 | Ohmori et al. | 137/590 |
| 4,579,139 | A * | 4/1986 | Stouffer | 137/142 |
| 4,582,039 | A * | 4/1986 | Nishida | 123/510 |
| 4,814,087 | A * | 3/1989 | Taylor | 210/641 |
| 4,951,699 | A * | 8/1990 | Lipman | 137/142 |
| 4,979,482 | A * | 12/1990 | Bartlett | 123/510 |
| 5,170,764 | A * | 12/1992 | Tuckey | 123/509 |
| 5,441,637 | A | 8/1995 | Gutjahr et al. | |
| 6,058,964 | A * | 5/2000 | Cotton et al. | 137/202 |
| 6,283,142 | B1 * | 9/2001 | Wheeler et al. | 137/265 |
| 6,871,640 | B2 * | 3/2005 | Atwood et al. | 123/509 |
| 6,907,899 | B2 * | 6/2005 | Yu et al. | 137/565.22 |
| 7,066,153 | B2 * | 6/2006 | Vitalis et al. | 123/514 |
| 7,069,914 | B2 * | 7/2006 | Nagata | 123/509 |
| 7,222,609 | B2 * | 5/2007 | Benzin et al. | 123/509 |

* cited by examiner

*Primary Examiner* — Thomas Moulis
(74) *Attorney, Agent, or Firm* — Walter Ottesen

(57) ABSTRACT

The invention relates to a fuel system of a portable handheld work apparatus driven by an internal combustion engine. The fuel system includes a fuel tank (2), a fuel pump, a fuel line (4) leading from the fuel tank (2) to the fuel pump and a first suction head (5) which is disposed at an end (7) of the fuel line (4) at the fuel tank. At least a second suction head (6) is arranged within the fuel tank (2) and is connected in the fuel line (4) in series ahead of the first suction head (5). The second suction head (6) has an external suction surface which is formed by a porous covering (9). The porous covering (9) delimits a suction space. A guide is arranged in the suction space which guides the through-passing fuel flow at least approximately along the entire inner surface of the porous covering (9).

15 Claims, 3 Drawing Sheets

FUEL SYSTEM OF A HANDHELD WORK APPARATUS

CROSS REFERENCE TO RELATED APPLICATION

This application claims priority of German patent application no. 10 2008 058 498.3, filed Nov. 24, 2008, the entire content of which is incorporated herein by reference.

FIELD OF THE INVENTION

The invention relates to a fuel system of a hand-guided work apparatus driven by an internal combustion engine.

BACKGROUND OF THE INVENTION

Work apparatus of this kind include a fuel tank wherein the fuel is stored for the operation of the internal combustion engine. Fuel is drawn by suction from the fuel tank by means of a fuel pump and is supplied to the carburetor of the engine in order to be there processed to an ignitable air/fuel mixture. For a clean mixture formation and a reliable running of the engine, it is necessary that the fuel be drawn free of bubbles. Otherwise, the mixture can become lean and, in the extreme case, this can lead to a stalling of the engine.

A lower-lying region of the fuel tank is selected wherein the fuel is drawn by suction referred to a usual work holding position which is constructively pregiven. In this way, the available fuel volume is at least approximately completely used before air is drawn. In portable work apparatus, during operation, angular positions, however, occur with reference to the gravitational direction (that is, the usual work position pregiven structurally) wherein a remaining component fill of fuel follows the weight force and collects in a side region of the fuel tank. In order to nonetheless make possible a bubble-free suction, a pendular-like suction unit is provided wherein a suction head is mounted at the end of the fuel line at the tank. The fuel line is configured in this region, for example, flexibly, so that the suction head can follow the fuel in the direction of the weight as a consequence of its own weight. Here, efforts are made to ensure that the suction head remains permanently immersed in the fuel as much as possible for different angular positions of the work apparatus in order to make possible an almost complete emptying of the fuel tank while simultaneously providing a bubble-free suction.

Limits are imposed with respect to the above-mentioned suction principle in the typical configuration of portable handheld work apparatus such as blower/suction apparatus, chain saws, brushcutters or the like which are provided for portable handheld operation. Here, there is the primary requirement for a small volume and lightweight configuration of such apparatus. The structural space available often compels construction wherein the fuel tank is configured comparatively wide transversely to the up direction and wherein the interior space of the fuel tank has numerous geometric irregularities. Although the suction head can lie on the base because of its own weight, for an inclined position, however, the suction head can move laterally only to a limited extent. The situation can occur that even a comparatively large remaining quantity of fuel collects so far laterally that the suction head can no longer follow the same and comes to rest above the level of the fuel. Air is then drawn by suction notwithstanding an adequate fuel quantity.

The typical design of portable handheld work apparatus is made difficult in that the fuel pump only has a low pumping capacity and that only low suction pressures are available.

Even a short-term case of the suction head becoming dry can lead to the situation that the associated air induction leads to operational disturbances or even to stalling of the engine.

SUMMARY OF THE INVENTION

It is an object of the invention to improve a fuel system of the kind described above so that an improved usage of the available fuel volume is possible even for an inclined position of the work apparatus.

The fuel system of the invention is for a portable handheld work apparatus driven by an internal combustion engine. The fuel system includes: a fuel tank for holding fuel for operating the engine; a fuel pump for pumping fuel from the fuel tank; a fuel line leading from the fuel tank to the fuel pump and having an end at the fuel tank; a first suction head mounted on the end of the fuel line; a second suction head disposed in the fuel tank and connected into the fuel line in series ahead of the first suction head; the second suction head having a porous covering defining an outer suction surface; the porous covering having an inner surface delimiting a suction space within the second suction head for accommodating a fuel flow passing therethrough; and, guide means mounted in the suction space for at least approximately guiding the fuel flow along the inner surface of the porous covering.

A fuel system is suggested wherein at least a second suction head is arranged within the fuel tank and is connected in the fuel line in series and ahead of the first suction head. The second suction head has an outer suction surface which is formed by a porous covering. The porous covering delimits a suction space. Guide means are arranged in the suction space which cause the through-passing fuel flow to be at least approximately conducted along the entire inner surface of the porous covering.

According to the invention, two suction heads are therefore provided which are connected in series so that they are flow conducting. The two suction heads are connected via an intermediate conducting segment so that they lie at a spacing to each other. In this way, it is ensured that at least one of the two suction heads is covered with fuel for different angular positions of the work apparatus and therefore of the fuel tank.

This, however, is not sufficient by itself because air could be drawn in by suction when the second suction head lies dry while, at the first suction head, no adequate suction pressure is present any more. The additional arrangement of the guide means in the suction space of the second suction head avoids, however, this problem in that the porous covering still remains wetted with fuel when the second suction head comes to lie above the level of the fuel. As a consequence of the capillary action of the porous covering, the porous covering remains wetted with fuel whereby a sealing function occurs.

The suction pressure generated by the fuel pump passes through the second suction head via the fuel line to the remote-lying first suction head. An inclined position of the work apparatus, which leads to the second suction head becoming dry, causes the fuel level to rise on the opposite-lying end whereby at least the first suction head is immersed. In this position, the fuel is drawn by suction through the first suction head notwithstanding the fact that the second suction head lies freely exposed because the second suction head is held moist and therefore remains seal tight. When there is inclination of the fuel tank in the opposite direction, the second suction head is covered whereby the capillary seal is ended. The first remote-lying suction head comes possibly to lie above the fuel level. As a consequence of the series connection of the two suction heads, this is, however, meaningless because the required suction pressure is present at the second suction head and a bubble-free drawing in of fuel is ensured. With an adequate fuel level in the fuel tank and/or for intermediate angular positions, both suction heads lie below the fuel level. It is therefore ensured that even for a low fuel level, the fuel is drawn in bubble-free and the available fuel volume can be almost completely exhausted independently of the angular position of the work apparatus and of the fuel tank connected fixedly thereto.

Different possibilities are available for the guide means and also the remaining configuration of the second suction head. The fuel flow can, for example, be guided through coaxially from one end face to the opposite-lying end face of the suction head. The guide means guide the through-flowing fuel flow, for example, in the form of a cylindrical jacket coaxially or spirally along the inner side of the porous covering. Preferably, an inlet and an outlet of the second suction head are arranged on the same end face thereof. The guide means are configured in the form of a partition wall which extends into the suction space starting from the above-mentioned end face. The arrangement of inlet and outlet on the same end face simplifies placement of the fuel line with a center tank connection so that the two suction heads are placed in opposite-lying end regions of the fuel tank and there maintain their positions at least approximately. It is then ensured that for each inclined position, at least one of the two suction heads lies below the fuel surface. The fuel flow, which passes through the second suction head, is deflected by approximately 180° starting from the inlet by means of the partition wall in the direction of the outlet. With simple means, it is effectively ensured that the porous covering remains permanently wetted as a consequence of the through-passing and deflected fuel flow and thereby maintains its sealing tightness.

In an advantageous further embodiment, the porous covering extends in a longitudinal direction and has a length. Here, the partition wall projects to a depth into the suction space which extends over approximately 50% of the length of the porous covering and especially over at least 75% thereof. In this way, a flow short circuit from inlet to outlet is avoided within the suction space so that the through-passing fuel flow is compelled to touch the entire interior surface of the porous covering.

In an advantageous embodiment, the longitudinal axes of the inlet and outlet are parallel to each other. Alternatively, it can be practical that these axes lie at an angle with respect to each other. This angle ($\alpha$) lies in a range from $45° \leqq \alpha \leqq 90°$ and is especially approximately 60°. For an axial parallel configuration of the inlet and outlet, the line segments connected thereto can be held very close to each other so that the corresponding suction head can be introduced into very narrow regions of the fuel tank and can there maintain its movability. Very small construction volumes for the base body of the second suction head are achievable for the angled arrangement of the longitudinal axes of inlet and outlet.

In a preferred embodiment, the porous covering is held within a frame as disclosed in U.S. Pat. No. 5,441,637 incorporated herein by reference. The inlet, the outlet and the partition wall are joined as one piece to a cover. The cover is connected to the frame and is especially latched thereto. With the one-piece configuration of inlet, outlet and partition wall, a clean flow guidance is possible without additional sealing measures. The connection between the cover and the frame can be configured without such sealing measures in a simple manner. The latching simplifies the cost-effective series manufacture and nonetheless ensures a reliable function.

Preferably, the porous covering extends closed in the peripheral direction of the second suction head and is especially configured so as to be cylindrical. In this way, a specific angular position is not important during the installation. Rather, a uniform fuel induction takes place distributed over the periphery. The low through-flow resistance associated therewith accommodates the low available suction pressure. Furthermore, a maximum of fuel is held in the porous covering as a consequence of the capillary action whereby the seal tightness thereof can be maintained permanently or at least over a very long time span without external wetting.

The advantages of the configuration of the invention become especially manifest in geometric relationships wherein the elevation of the fuel tank is less than its width and especially less than half of the width. The first suction head is arranged in a first half of the fuel tank referred to the lateral direction and the second suction head is arranged in the opposite-lying second half of the fuel tank. It is precisely with such flat structural shapes of the fuel tank, that the lateral shift of the fuel supply becomes especially significant for an inclined position of the work apparatus. By adapting the lengths of the different segments of the fuel line, it can be assured that both lateral halves of the fuel tank each accommodate one of the two suction heads. They do have a limited movability there in order to follow the sloshing movements of the fuel. This movability is, however, restricted by the tank geometry, the limited flexibility of the individual line segments or the like in such a manner that none of the suction heads shifts excessively and even under circumstances becomes wedged. With a rapid change of inclination but also for a long continuous operation in the inclined position at only one direction of inclination, it is ensured that at least one of the two suction heads lies below the fuel surface.

Various materials can be used for configuring the porous covering such as lattices, sieves or the like insofar as they can provide a capillary action to hold fuel. Preferably, the porous covering is formed by a sinter body. This body can be configured with a corresponding thickness without generating an excessively high through-flow resistance. As a consequence of its significant thickness, a three-dimensional form body is provided which can store a larger quantity of fuel via capillary action which facilitates the sealing action in the dry state. This becomes especially effective when the fuel pump is a membrane pump. The suction pressure is comparatively slight compared to a gear pump or the like. The capillary action of the suction head lying above the fuel surface can withstand this low suction pressure so that the sealing action of the fuel wetting remains notwithstanding the applied pressure difference.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
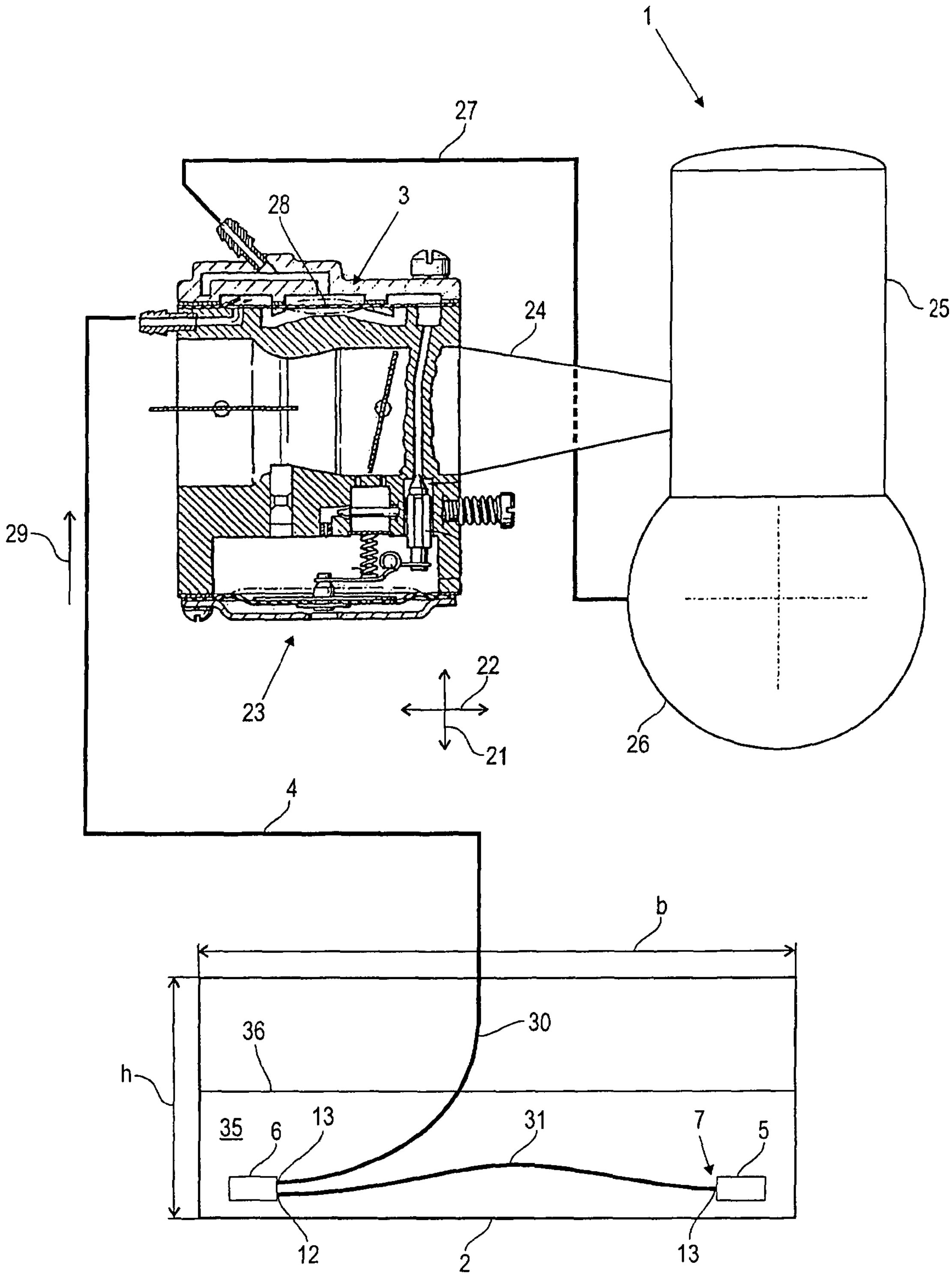
FIG. 1 is a schematic block diagram of the fuel system of the invention shown with an internal combustion engine, a carburetor and a fuel tank wherein two suction heads are arranged.

FIG. 1 shows a schematic block diagram of the fuel system of the invention. The fuel system is for a portable handheld work apparatus driven by an internal combustion engine 1 which is provided for operation by a user when carried on the back or when hand carried. Such a work apparatus can, for example, be a blower/suction apparatus, a chain saw, a brush-cutter or the like.

The schematically represented internal combustion engine 1 is shown as a single-cylinder two-stroke engine in the embodiment shown; however, the engine can also be a four-stroke engine and includes a cylinder 25 as well as a crankcase 26. A carburetor 23 is provided for forming an air/fuel mixture which supplies the engine 1 with the formed air/fuel mixture via an intake channel 24.

Fuel 35 is held in a fuel tank 2 for the operation of the engine 1 and forms a fuel level 36. The fuel 35 is drawn by suction from the fuel tank 2 by a fuel pump 3 and is conveyed to the carburetor 23. In the embodiment shown, the fuel pump 3 is a membrane pump integrated into the carburetor 23. The membrane pump has a membrane 28 which is charged by pulsating pressure within the crankcase 26 via a pressure line 27. An oscillatory movement of the membrane 28 results herefrom. The oscillatory movement draws fuel in correspondence to arrow 29 via built-in flutter valves through a fuel line 4 from the fuel tank 2.

The component assemblies of the work apparatus shown here are shown for a usual work position wherein an up direction 21 and a lateral direction 22 are pregiven. The fuel tank 2 has an elevation (h) in the up direction 21 and a width (b) in the lateral direction 22. The elevation (h) is less than the width (b). Preferably, the elevation is less than half the width (b) but also can only be a quarter thereof or even less thereof. The engine 1, the carburetor 23 and the fuel tank 2 are part of the work apparatus and are fixedly integrated therein so that they conjointly all participate in each pivot movement of the work apparatus.

Starting from the carburetor 23 and within the fuel tank 2, the fuel line 4 extends with a first line segment 30 and thereafter, with a second line segment 31 and ends at end 7 within the fuel tank. A first suction head 5 is connected to the end 7 via an outlet 13. Furthermore, a second suction head 6 is provided which is connected in the fuel line 4 in series ahead of the first suction head 5. For this purpose, the second suction head 6 includes an inlet 12 and an outlet 13. The second line segment 31 coming from the first suction head 5 is connected to the inlet 12 while the first line segment 30, which leads to the carburetor 23, is connected to the outlet 13.

The two line segments (30, 31) are configured as flexible hose pieces. Their resilience is so dimensioned that the two suction heads (5, 6) can sink approximately to the base of the fuel tank 2 as a consequence of their weight force. The length and course of the two line segments (30, 31) are so selected in connection with the available stiffness of the hose material that the first suction head 5 is disposed in a first half of the fuel tank referred to the lateral direction 22 and the second suction head 6 lies in the second half of the fuel tank 2 at least in the usual work position shown here.

Figure 2:
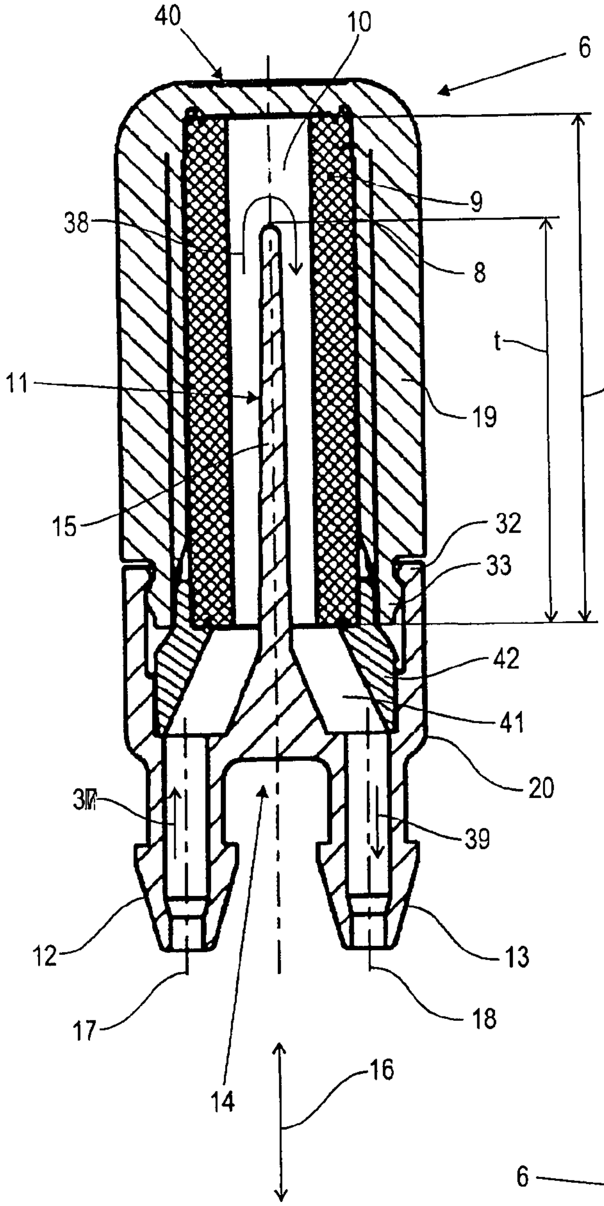
FIG. 2 is a longitudinal section view of a first embodiment of a suction head having an inlet and an outlet, which are axially parallelly arranged, as well as a partition wall in the suction space surrounded by a porous covering.

FIG. 2 is a longitudinal section view of a first embodiment of the second suction head 6 of FIG. 1. The second suction head 6 extends in a longitudinal direction 16 and includes an inner suction space 10 which, referred to the longitudinal direction 16, is delimited in the peripheral direction by a porous covering 9. An outer surface of the porous covering 9 forms an outer suction surface 8 which is, in the immersed state, in direct contact with the fuel 35 (FIG. 1). The fuel 35 is drawn by suction through the outer suction surface 8. It can be practical to arrange several individual porous coverings 9 peripherally around the longitudinal direction 16 or only on one side thereof.

In the embodiment shown, the porous covering 9 is configured so as to be cylindrical and runs closed in the peripheral direction of the second suction head 6 in the peripheral direction 16 or about the suction space 10. Also, the outer suction surface 8 runs peripherally. In lieu of a cylindrically peripherally running form, a conically peripherally running form or the like can be practical. The porous covering 9 is formed by a sinter body wherein plastic granulate is sintered together under temperature and pressure to a permeable porous material. A metallic sinter body can also be practical.

Furthermore, the second suction head 6 is provided with an inlet 12 and an outlet 13 formed as respective hose nipples to accommodate pushing the line segments (30, 31) thereover (FIG. 1). For specific applications, it can be practical to place the inlet 12 and outlet 13 on opposite-lying end faces (14, 40) of the second suction head 6. In the embodiment shown, the inlet and outlet are arranged on the same common end face 14 of the second suction head 6. Longitudinal axes (17, 18) of the inlet 12 and the outlet 13, respectively, lie parallel to each other and to the longitudinal direction 16. The inlet 12 and the outlet 13 communicate flow conductingly with the suction space 10.

Guide means 11 is arranged in suction space 10 and this guide means is provided to guide the through-passing fuel flow at least approximately along the entire inner surface of the porous covering 9. In the embodiment shown, the guide means 11 is configured in the form of a partition wall 15 which, starting from the end face 14, extends into the suction space 10. The porous covering 9 has a length (L) and the partition wall 15 extends into the suction space 10 to a depth (t). The depth (t) is at least 50% of the length (L) and is especially at least 75% thereof.

In the embodiment shown, the depth (t) extends over approximately 80% of the length (L). In this way, the situation is achieved that the fuel flow, which enters via the inlet 12 into the suction space 10 in correspondence to the arrow 37, is guided along the partition wall 15 up to a closed end face 40 lying opposite the end face 14. There, a deflection of the fuel flow takes place by approximately 180° into the opposite direction corresponding to arrow 38 and, as a consequence thereof, the deflected fuel flow exits from the outlet 13 in correspondence to arrow 39.

The guidance of the fuel flow along both sides of the partition wall 15 between the two end faces (14, 40) leads to the situation that the through-passing fuel flow is guided along the entire inner surface of the porous covering 9. In this way, the porous covering is wetted with fuel entering through the inlet 12 even when the second suction head 6 comes to lie above the surface of the fuel. The porous covering 9 remains completely soaked with fuel as a consequence of the capillary action thereof. In this way, the covering 9 acquires a seal tightness and, as a consequence thereof, an induction of air through the porous covering 9 is prevented.

Figure 3:
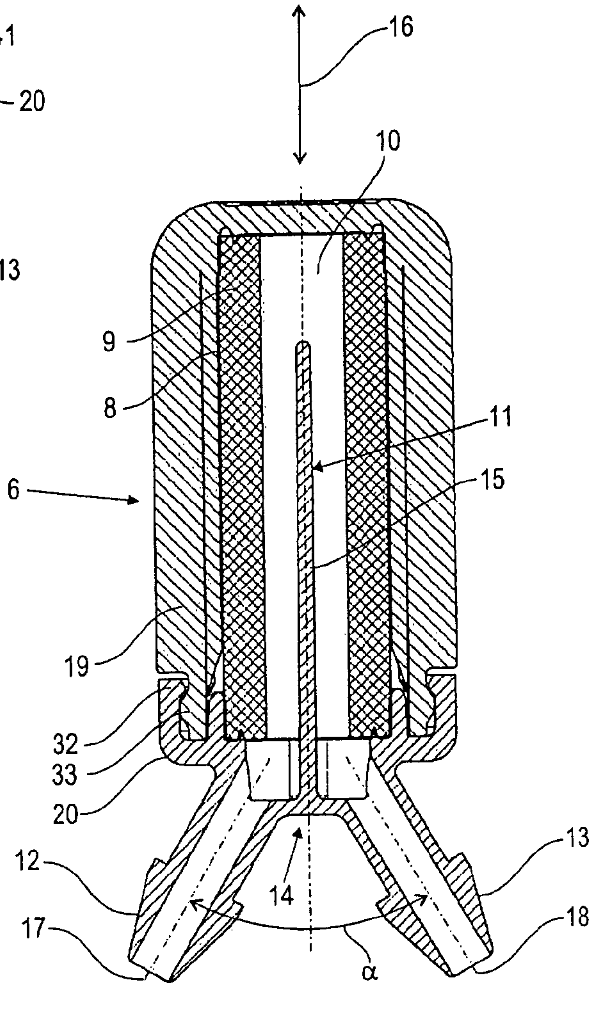
FIG. 3 shows a variation of the arrangement of FIG. 2 in a shortened configuration having an inlet and an outlet arranged at an angle with respect to each other.

In a specific configuration of the second suction head 6, a lattice-like frame 19 is provided in which the porous covering 9 is held as shown in greater detail in FIGS. 2 and 3 of U.S. Pat. No. 5,441,637 incorporated herein by reference. Furthermore, a cover 20 is provided which latches by means of elastic resilient latch hooks 32 on a peripherally-extending latch edge 33 of cover 20. In lieu of a latching, an adhesive can be practical as can a welding or the like. The inlet 12, the outlet 13 and the partition wall 15 are configured as a single piece with the cover 20. The frame 19 and the cover 20 are injection molded plastic parts.

The inlet 12 and the outlet 13 are arranged so as to lie diametrically opposite each other and are axially parallel referred to the longitudinal direction 16. As a consequence of this arrangement, the inlet and outlet are at a radial distance from each other which is greater than the inner diameter of the porous covering 9 or suction space 10. In order to nonetheless establish a good flow conducting connection between the inlet 12 and the suction space 10 as well as a good flow conducting connection between the outlet 13 and the suction space, transition space 41 is provided in the axial direction between the inlet 12 and outlet 13 on the one hand and the suction space 10 on the other hand. In the transition space 41, an axial spacer 42 is arranged which holds the porous covering 9 form tight in the frame 19 thereby preventing an axial slippage into the transition space 41.

The first suction head 5 of FIG. 1 is configured essentially identically to the second suction head 6 of FIG. 2. However, only an outlet 13 is provided but not an inlet 12 and also no guide means 11. The outlet 13 of the first suction head 5 configured in this manner lies then preferably centered to the longitudinal axis.

FIG. 3 shows a longitudinal section view of a variation of the suction head 6 wherein the longitudinal axes (17, 18) of the inlet 12 and outlet 13, respectively, conjointly define an angle ($\alpha$). The angle ($\alpha$) preferably lies in a range of 45° equal to or less than ($\alpha$) equal to or less than 90° and is about 60° in the embodiment shown. The longitudinal axes (17, 18) intersect in the suction space 10. For this reason, the transition space 41 and the spacer 42 of FIG. 2 are not needed whereby the structural shape of the suction head 6 of FIG. 3 is shortened compared to the suction head of FIG. 2 referred to the longitudinal direction 16. The embodiment of FIG. 3 corresponds to that of FIG. 2 with respect to the remaining features and reference numerals.

Figure 4:
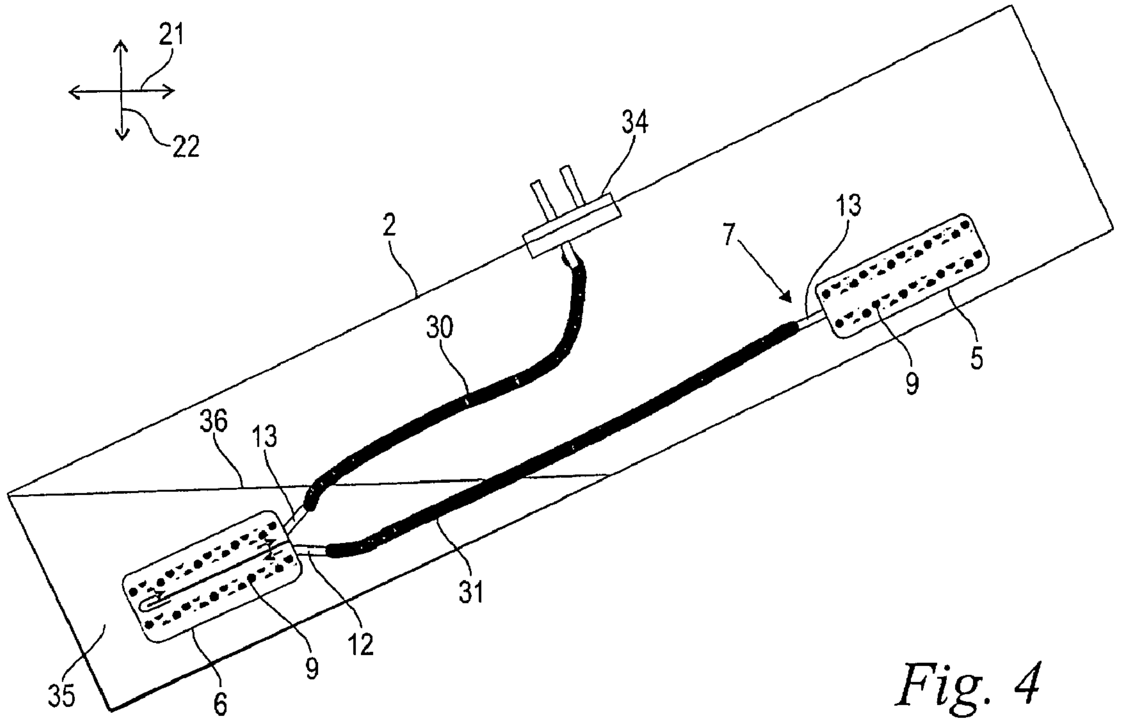
FIG. 4 shows the fuel tank of FIG. 1 at a lateral inclination and with the second suction head immersed in the fuel; and, FIG. 5 shows the fuel tank of FIG. 4 having an opposite inclination wherein the first suction head lies below the fuel surface.

FIG. 4 shows the fuel tank 2 wherein, during operation of the work apparatus, the latter has been laterally tilted compared to the usual work position of FIG. 1. The fuel tank is not completely filled with fuel 35. As a consequence of the weight force, the fuel 35 collects in the lower-lying half while forming the fuel level 36. More specifically, the fuel collects in the lower lateral corner of the fuel tank 2.

On its upper side, the fuel tank 2 is provided with a connector 34 which, referred to the lateral direction 22, is preferably arranged centrally in the upper cover wall of the fuel tank 2. The first line segment 30 is led from the connector 34 to the outlet 13 of the second suction head 6. The outlet 13 of the first suction head 5 is connected to the inlet 12 of the second suction head 6 by means of the second line segment 31. In this way, the first suction head 5 and the second suction head 6 are connected flow-conductingly in series. At the same time, the lengths and the stiffness of the two line segments (30, 31) are so dimensioned that the first suction head 5, referred to the lateral direction 22, lies in a first half of the fuel tank 2 and the second suction head 6 lies in the second half of the fuel tank 2. The resilience of the line segments (30, 31), which comprise hose material, permits that the two suction heads (5, 6) come to rest at the base of the fuel tank 2 in the direction of the weight force or are caused to at least lie only a small vertical distance from the base. Notwithstanding the inclined position of the fuel tank 2 shown, the first suction head 5, however, can not slip into the region of the second suction head 6.

For the tilt angle of the fuel tank 2 shown here, it is overall achieved that the second suction head 6 lies in the fuel 35 below the fuel surface 36 while the first suction head 5 lies dry above the fuel surface.

Figure 5:
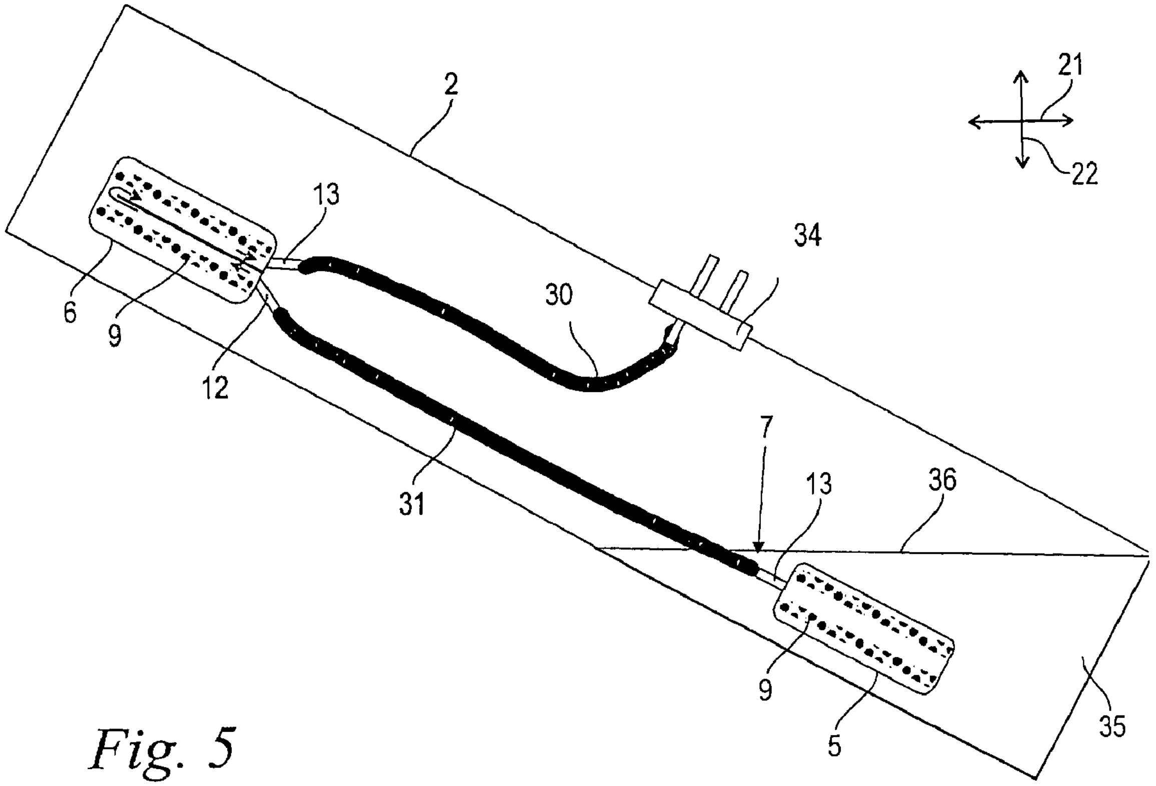

FIG. 5 shows the arrangement of FIG. 4 wherein the fuel tank 2 is tilted so as to be inclined in the opposite direction. Here, the fuel 35 collects in the opposite-lying half, that is, in the region of the opposite-lying lower corner of the fuel tank 2. In this case, the first suction head lies in the fuel below the fuel surface 36 while the second suction head 6 lies dry above the fuel surface 36. With this angle of inclination too, the geometric arrangement of the line segments (30, 31) in combination with their stiffness prevents the situation that the second suction head 6 slips into the region of the first suction head 5.

By viewing FIGS. 1, 4 and 5 together, it is clear that, for small angles of inclination and a high fuel level, both suction heads (5, 6) corresponding to FIG. 1 lie in the fuel 35 below the fuel surface 36, but that, for greater angles of inclination and a lower fuel level, at least one of the two suction heads (5, 6) lies in the fuel below the fuel surface 36.

In the angular position according to FIG. 4, the suction underpressure of the fuel pump 3 (FIG. 1) transfers via the first line segment 30 to the second suction head 6, that is, to the suction space 10 thereof (FIGS. 2 and 3). As a consequence of the underpressure which is present, the fuel is drawn by suction through the porous covering 9 of the second suction head and is conveyed to the carburetor 23 (FIG. 1). Here, it is of no significance that the first suction head 5 lies dry above the fuel surface 36.

However, when, starting from the usual work position of FIG. 1 or the inclined work position of FIG. 4, the opposite inclination of FIG. 5 occurs during the operation of the work apparatus, then the porous covering 9 of the second suction head is at first still wetted with fuel or soaked with fuel. In this way and in combination with the capillary action in the porous covering 9, a sealing action occurs and, as a consequence of the sealing action, the suction underpressure in the first line segment 30 is conducted further through the second suction head 6 and the second conducting segment 31 to the first suction head 5. An induction of fuel 35 takes place by means of the first suction head 5. This fuel is moved via the second line segment 31 to the inlet 12 of the second suction head 6. Corresponding to FIGS. 2 and 3, this fuel flow is moved through the suction space 10 of the second suction head 6 via the first line segment 30 (FIG. 5) and the remaining fuel line 4 to the carburetor 23 (FIG. 1). The guide means 11 (FIGS. 2, 3) effect, in the manner described, a permanent wetting of the entire inner surface of the porous covering 9 (FIGS. 2 and 3). This covering remains moist and therefore seal tight even when the second suction head 6 lies dry above the fuel surface 36 corresponding to FIG. 5 and when an induction takes place only through the first suction head 5.

The suction underpressure, which is generated by the fuel pump 3 configured as a membrane pump, is only approximately 100 mbar in the suction space 10 (FIGS. 2 and 3). The capillary action in the porous covering 9 of the second suction head 6 is so dimensioned that this suction underpressure is not sufficient to overcome the sealing effect in the state of FIG. 5 wherein the suction head 6 lies dry. However, as soon as the second suction head 6 of FIG. 1 or FIG. 4 comes to lie below the surface 36 of the fuel, the previously described capillary action is without significance. Fuel can be drawn by suction through the porous covering 9 of the second suction head 6.

Overall, it is ensured that in each laterally inclined position of the fuel tank 2 of FIGS. 1, 4 and 5, fuel 35 from the fuel tank 2 is drawn by suction without air and therefore free of bubbles. The carburetor 23 (FIG. 1) is supplied with an uninterrupted fuel flow so that the internal combustion engine 1 runs without malfunction for different angular positions and even when the fill level of the fuel tank 2 (FIG. 1) is low.

It is understood that the foregoing description is that of the preferred embodiments of the invention and that various changes and modifications may be made thereto without departing from the spirit and scope of the invention as defined in the appended claims.

What is claimed is:

1. A fuel system for a portable handheld work apparatus driven by an internal combustion engine, the fuel system comprising:

a fuel tank for holding fuel for operating said engine;

a fuel pump for pumping fuel from said fuel tank;

a fuel line leading from said fuel tank to said fuel pump and having an end at said fuel tank;

a first suction head mounted on said end of said fuel line;

a second suction head disposed in said fuel tank and connected into said fuel line in series ahead of said first suction head;

said second suction head having a porous covering defining an outer suction surface;

said porous covering having an inner surface delimiting a suction space within said second suction head for accommodating a fuel flow passing therethrough; and, guide means mounted in said suction space for at least approximately guiding said fuel flow along said inner surface of said porous covering.

2. The fuel system of claim 1, wherein said second suction head has an end face, an inlet and an outlet formed on said end face; and, said guide means is configured as a partition wall extending from said end face into said suction space.

3. The fuel system of claim 2, wherein said porous covering extends in a longitudinal direction to have a length (L); said partition wall extends into said suction space to a depth (t); and, said depth (t) extends over at least 50% of said length (L).

4. The fuel system of claim 3, wherein said depth (t) extends over at least 75% of said length (L).

5. The fuel system of claim 2, wherein said inlet and said outlet define respective longitudinal axes which are parallel to each other.

6. The fuel system of claim 2, wherein said inlet and said outlet define respective longitudinal axes conjointly defining an angle ($\alpha$) with respect to each other and wherein said angle ($\alpha$) lies in a range of $45° \leqq \alpha \leqq 90°$.

7. The fuel system of claim 6, wherein said angle ($\alpha$) is approximately 60°.

8. The fuel system of claim 2, wherein said second suction head comprises a frame holding said porous covering therein; said inlet, said outlet and said partition wall are formed as a single piece to define a cover; and, said cover is connected to said frame.

9. The fuel system of claim 8, wherein said frame and said cover conjointly define an interface configured to permit said frame and said cover to be latched to each other.

10. The fuel system of claim 1, wherein said second suction head defines a peripheral direction; and, said porous covering is closed in said peripheral direction.

11. The fuel system of claim 10, wherein said porous covering is configured to be cylindrical.

12. The fuel system of claim 1, wherein said work apparatus has a usual work position for which there is an up direction and a lateral direction; said fuel tank having an elevation (h) in said up direction and a width (b) in said lateral direction; said elevation (h) is less than said width (b); said first suction head is disposed in a first half of said fuel tank referred to said lateral direction and said second suction head is arranged in a second half of said fuel tank.

13. The fuel system of claim 12, wherein said elevation (h) is less than half of said width (b).

14. The fuel system of claim 1, wherein said porous covering is defined by a sinter body.

15. The fuel system of claim 1, wherein said fuel pump is a membrane pump.

* * * * *